J. P. Tyler.
Saw.
Nº 92,909.   Patented Jul. 20, 1869.
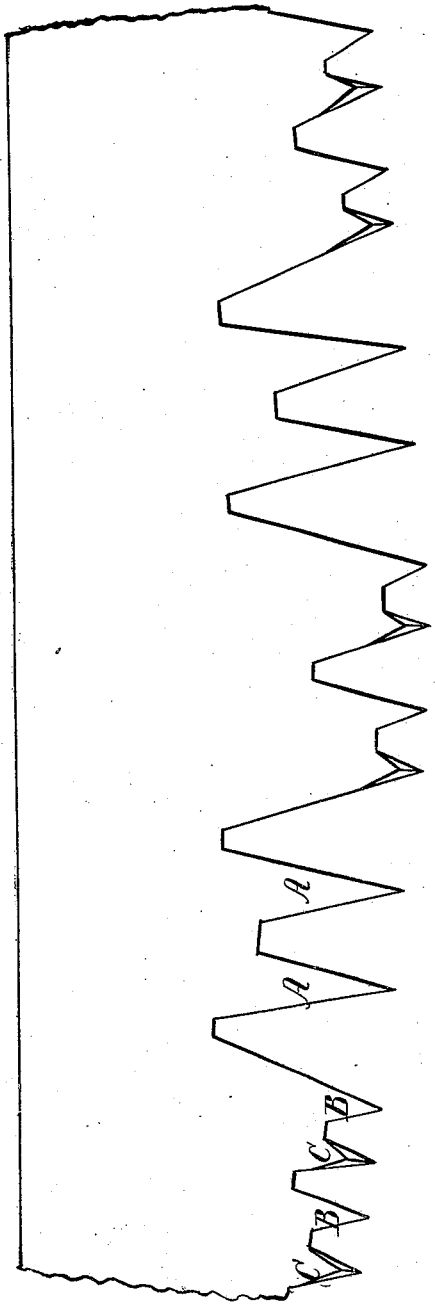
Witnesses;
Alonzo J. Lyon
John L. Lewis Jr.
Inventor;
John P Tyler

United States Patent Office.

JOHN P. TYLER, OF PENN YAN, NEW YORK.

Letters Patent No. 92,909, dated July 20, 1869.

IMPROVEMENT IN SAWS.

The Schedule referred to in these Letters Patent and making part of the same.

*To all whom it may concern:*

Be it known that I, JOHN P. TYLER, of Penn Yan, in the county of Yates, and State of New York, have invented a new and useful Improvement in Saws; and I do hereby declare that the following is a full, clear, and exact description of the construction and operation of the same, reference being had to the annexed drawing, making a part of this specification, in which the figure is a side view of a portion of the saw.

Heretofore saws have been made with pairs of fleam or cutting-teeth, and with pairs of chisel-shaped clearing-teeth; and pairs of fleam-teeth have been used with a single tapering clearing-tooth.

In these saws difficulty is experienced in maintaining the proper set of the fleam-teeth, because they have usually been made of considerable length, and liable to bend, or else only in single pairs, and not reliable in cutting off the grain of the wood, and the kerf grows narrower, and the saw binds.

Another difficulty has arisen from the space for sawdust being too small for the accumulation in sawing through large timber.

The nature of my said invention consists in a saw formed of two pairs of fleam or cutting-teeth, with a space between the pairs for the reception of dust from the first pair, that the operation of the second pair may not be obstructed, in combination with intermediate pairs of tapering clearing-teeth; the spaces between which clearing-teeth are less than the spaces between the fleam and clearing-teeth, thereby a large space is left for the reception of the larger portions of the sawdust between the first clearer and the fleam-teeth, and the space between the first and second clearer is less, being only sufficient to contain the dust and small particles behind the first clearer, thereby preventing their interfering with the following pairs of fleam or scoring-teeth.

By this construction, the saw is adapted to use in crosscut-sawing. All the teeth are operative in either direction, and the spaces for the sawdust are proportioned to the amount that each will receive; thereby I am enabled to get as many teeth as possible into the saw, and maintain the necessary proportion of dust-space to the cutting and clearing-teeth, and the fleam-teeth are of a shape to maintain their set, and the consequent width of the saw-kerf.

To enable others skilled in the art to make and use my invention, I will proceed to describe its mode of construction and operation.

I use the ordinary saw-blade, of any size or thickness required.

A and A are clearing-teeth. They are made between the pairs of cutting-teeth, as shown in the figure. The space between them is not so deep into blade for the purpose of keeping the points of the teeth in the line of the blade when cutting gnarly timber. The space between the cutting and clearing-teeth is deeper, for the purpose of making more room for the chips, and this the only place that space can be made for chips, without weakening some of the teeth.

B and B are fleam-teeth, that are set one way, and C and C are fleam-teeth, set in the opposite direction sufficient to give the size of kerf required. The space between the two fleam-teeth next to the clearing-teeth is of less depth, for the purpose of making the teeth stronger, so that they will hold their points in position when cutting all kinds of timber, or in the various directions that timber is required to be cut. The space between this pair of cutting-teeth and the adjoining pair of cutting-teeth is made deeper into the blade, for the purpose of making the angle at the points of the teeth more acute, and making the space larger. This space may be made any depth required, without causing the cutting-teeth to tremble or vary from the line in which they are set.

Having thus fully described my invention,

What I claim, and desire to secure by Letters Patent, is—

A saw, formed with a space between the pairs, B C, of fleam-teeth, and with pairs of tapering clearing-teeth A A, having larger spaces between the fleam-teeth and the clearing-teeth than between the clearing-teeth in each pair, as and for the purposes set forth.

JOHN P. TYLER.

Witnesses:
ALONZO T. LYON,
JOHN L. LEWIS, Jr.